United States Patent [10] Patent No.: US 11,675,754 B2
Goel et al. [45] Date of Patent: Jun. 13, 2023

(54) SYSTEMS AND METHODS FOR UNIVERSAL REFERENCE SOURCE CREATION AND ACCURATE SECURE MATCHING

(71) Applicant: Collibra Belgium BV, Brussels (BE)

(72) Inventors: Satyender Goel, Chicago, IL (US); James B. Cushman, Longboat Key, FL (US)

(73) Assignee: Collibra Belgium BV, Brussels (BE)

( * ) Notice: Subject to any disclaimer, the term of this patent is extended or adjusted under 35 U.S.C. 154(b) by 0 days.

(21) Appl. No.: 17/103,751

(22) Filed: Nov. 24, 2020

(65) Prior Publication Data

US 2022/0164324 A1 May 26, 2022

(51) Int. Cl.
*G06F 16/215* (2019.01)
*G06F 16/2455* (2019.01)
*G06F 16/27* (2019.01)
*G06F 16/23* (2019.01)
*G06F 21/60* (2013.01)
*G06F 21/62* (2013.01)

(52) U.S. Cl.
CPC ........ *G06F 16/215* (2019.01); *G06F 16/2365* (2019.01); *G06F 16/24558* (2019.01); *G06F 16/27* (2019.01); *G06F 21/602* (2013.01); *G06F 21/6254* (2013.01)

(58) Field of Classification Search
CPC ............... G06F 16/215; G06F 16/2365; G06F 16/24558; G06F 16/27; G06F 21/602; G06F 21/6254; G06F 16/9014; G06F 21/6218; G06Q 30/018; H04L 9/3213
See application file for complete search history.

(56) References Cited

U.S. PATENT DOCUMENTS 10,877,947 B2 * 12/2020 Iska .................. G06N 3/04
10,929,441 B1 * 2/2021 Phillips ............. G06F 16/258
(Continued)

FOREIGN PATENT DOCUMENTS

EP 1118948 A2 7/2001
WO 2017161403 A1 9/2017

OTHER PUBLICATIONS

International Search Report and Written Opinion dated Feb. 25, 2022 for International Patent Application No. PCT/US2021/082677, 16 pages.

*Primary Examiner* — Albert M Phillips, III
(74) *Attorney, Agent, or Firm* — Perkins Coie LLP

(57) ABSTRACT

The present disclosure is directed to systems and methods for reference source matching. Specifically, the systems and methods disclosed enable matching among tokens using a reference source. In one example, a Consolidation Platform may receive tokens from a customer environment and tokens from a reference source environment. The customer tokens may be compared to each other using AB matching. If a match does not occur, the customer tokens may further be compared to the reference source tokens via transitive matching. If a match does occur, then the customer tokens may be denoted as a match. In further example aspects, the reference source may be a universal reference token repository that comprises unique tokens. If, after a match is indicated, the matched token(s) may be compared to the universal reference token repository. If the matched token(s) does not exist, it may be added to the repository for future use.

20 Claims, 10 Drawing Sheets

(56) References Cited

U.S. PATENT DOCUMENTS

| | | |
|---|---|---|
| 2004/0107203 A1 | 6/2004 | Burdick et al. |
| 2015/0199744 A1* | 7/2015 | Tolvanen ............ G06F 16/9537 |
| | | 707/737 |
| 2020/0184100 A1 | 6/2020 | Ong et al. |

* cited by examiner

SYSTEMS AND METHODS FOR UNIVERSAL REFERENCE SOURCE CREATION AND ACCURATE SECURE MATCHING

CROSS-REFERENCE TO RELATED APPLICATION(S)

This present application is related to the Applicant's co-pending applications: U.S. patent application Ser. No. 16/844,927, entitled "CONTEXT DRIVEN DATA PROFILING"; U.S. patent application Ser. No. 16/776,293, entitled "SYSTEMS AND METHOD OF CONTEXTUAL DATA MASKING FOR PRIVATE AND SECURE DATA LINKAGE"; and U.S. patent application Ser. No. 17/103,720, entitled "SYSTEMS AND METHODS FOR DATA ENRICHMENT." The forgoing applications are hereby incorporated by reference herein in their entireties.

TECHNICAL FIELD

The present disclosure relates to accuracy by reference source matching.

BACKGROUND

Entities maintain large amounts of data that may be disorganized and/or incomplete. For example, an entity may maintain more than one incomplete record related to a subject, such as an individual, product, organization, etc. One record may contain a subject's address, email, gender, and geographic location, while the other record may contain a subject's name, address, phone number, date-of-birth, and credit card information. Each of these records may be incomplete. Similar incomplete records may exist for products and organizations. Currently, entities desiring to reconcile these disjointed records typically must manually combine these records, which results in inefficient and time-consuming processes, as well as potential exposure to personally identifiable information.

Linking, de-duplicating, or finding matches between data assets remains one of the biggest problems of most organizations due to the breadth of data sources. Multi-channel data collection and in-house replication for serving the need of customers and business stakeholders poses challenges of reconciliation. Other problems like incompleteness, data entry mistakes, and changes over time, make it difficult for establishing a master (i.e., a "golden") record of data.

Another issue that entities face is ensuring data integrity of the records they may possess. For example, an entity may have two incomplete records seemingly associated with the same data subject. However, one record may list a different email address or phone number than the other. Such data discrepancies decrease the integrity of data records and make it more difficult for an entity to reconcile multiple, incomplete data records because the entity may be unsure which record is actually correct. Furthermore, an entity may be unsure to what extent a certain record may be correct. Modern day enterprises are hampered when it comes to accurate data collection and reconciliation.

As such, there is an increased need for systems and methods that can address the challenges of modern-day data collection and reconciliation, including the inefficiency of matching multiple incomplete records to the same data subject, the loss of integrity when records are inconsistent, and the potential exposure of personally identifiable information (PII), sensitive business information, and/or any form of confidential information, when such attempts to match and reconcile data records are made.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Non-limiting and non-exhaustive examples are described with reference to the following figures.

DETAILED DESCRIPTION

Figure 1:
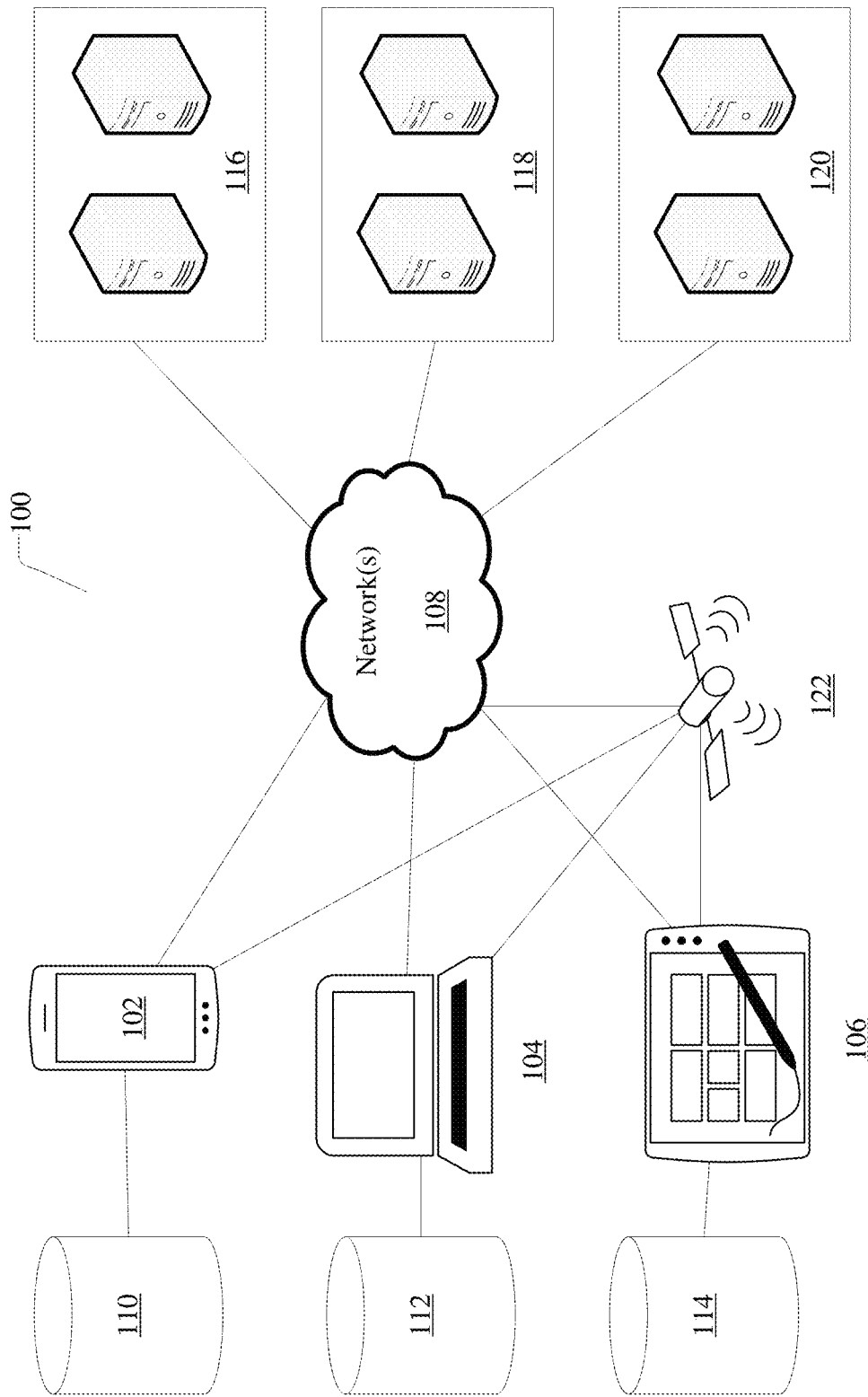
FIG. 1 illustrates an example of a distributed system for Reference Source matching, as described herein.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Embodiments of the present application are directed at systems and methods associated with data matching, specifically secure matching via a universal reference token record and intelligent source creation. Data matching processes can be used to generate insights into data that may increase data quality. For example, a data insight can include duplicate or multiple instances of data attributes within a domain and across domains, including a percentage overlap. Specifically, two data records may be associated with the same data subject. Data profiling may indicate that these two records overlap to a certain extent and may also highlight any similarities or differences in the records. Furthermore, data profiling processes may include data insights, which may include a data quality report from normalization and standardization (i.e., what percent is standard versus non-standard) or trends based on label processing (e.g., records with the same home address).

Data masking may refer to the hashing and/or encryption client-specific information. Through this application, "client" may refer to the Customer and/or the Reference Source. In order for an entity to transmit sensitive data (e.g., PII) to a third-party (e.g., Consolidation Platform), the data usually should be tokenized. In some examples described here, client-specific information may be first hashed and encrypted and then uploaded to a secure server. The tokenized information may be retrieved from the secure server and analyzed. The tokenized client-specific information (i.e., "client tokens") may be tokenized using a combination of hash (one way compression function) and/or encrypted, wherein the hash code may include an additional computer-generated Secure Hash Algorithm (SHA2 512/256) salt. Other hashing and encryption methods may be used, including but not limited to, SHA2 348, SHA3, TripleDES, Twofish encryption algorithms, Blowfish encryption algorithms, Advanced Encryption Standard (AEs), IDEA encryption algorithm, MD5 encryption algorithms, and/or RSA security encryption algorithms. When the third-party server receives information transmitted from a Customer or Reference Source, the information is in the form of tokens. In other words, the raw data from the Customer and/or Reference Source (i.e., "client") is hashed and encrypted prior to being transmitted to the third-party secure server. The Consolidation Platform does not receive or process raw data.

In some example aspects, a first label included in a listing of anonymized labels that corresponds to a type of information in a tokenized attributed based on an identified classifier may be included. The label can provide an anonymized identifier of a type of information represented in the attribute. The label can be generated based on any of the attribute and the classifier. For example, if an attribute relates to a name, the corresponding label can be "La1." In these embodiments, only entities with access to a listing of the information corresponding to the labels can identify the type of information identified by each label, thereby anonymizing the data. To the third-party Consolidation Platform, the actual, unencrypted attribute or classifier may be unknown due to the tokenization of the data. For example, a certain attribute may refer to a data subject's address and have a label of "Address," but once labelized, this label may be token "La1" to the third-party Consolidation Platform. Further description of this process can be found in U.S. patent application Ser. No. 16/844,927, which is incorporated by reference in its entirety.

Data consolidating refers to consolidating two or more data records to create a single data record. For instance, a data record may include the data attributes of Name, DOB, Gender, and Email address. Another data record may include the data attributes of Name, Gender, Home address, and Phone number. If these two records are consolidated, then a single data record may be created that includes the data attributes of Name, DOB, Gender, Email address, Home address, and Phone number. Once consolidated, the consolidated data record may be known as a "composite."

A data composite may be useful to entities that may have multiple data records associated with a single data subject. For example, a bank may have a data record for a data subject's checking account and a data record for that same data subject's home loan. Both of these data records may include overlapping information, but one data record may include certain data attributes that the other data record does not include. As such, creating a composite of these data records may be beneficial to the entity, resulting in greater efficiency and higher levels of data integrity.

As described herein, an entity may utilize the systems and methods presented to match certain tokens using a reference token repository. For instance, a client may have two databases with two separate records associated with the same entity (e.g., person, place, product, thing, etc.). The client may submit these records to a data masking application that produces private and secure tokens for each of these records. These tokens may then be transmitted to a consolidation platform, where the tokens are analyzed for matching. The tokens may be compared to each other in some instances (i.e., A-B matching). In other instances, the tokens may be compared to a reference token repository to identify matching records (i.e., transitive matching). If the tokens match, then one of the tokens (i.e., a unique token) may be stored in the reference token repository for future use. Such a process of storing unique tokens ensures an efficient repository because no duplicate tokens will exist in the repository.

The systems and methods presented herein utilize Reference Sources to corroborate data records and fill in potential missing data attributes for a data record. A Reference Source is an entity that has data that is used as a reference point. For example, a Reference Source may be a "trusted" source, like a credit bureau, a bank, and/or a government entity. However, because "trust" is subjective, for purposes of this application, a Reference Source is any source that is used as a reference for comparison against another source (e.g., Customer source). For example, a Customer may have multiple data records for a data subject, but some data attributes may be missing. The Customer may hash and encrypt this data (i.e., transform the raw data into tokens) and then upload the tokens to a secure server where a third-party Consolidation Platform may access the Customer tokens. Additionally, a Reference Source may have complete and verified records (i.e., "trusted" records) that are hashed and encrypted (i.e., tokenized) and then uploaded to a secure server managed by the Consolidation Platform. The third-party Consolidation Platform may access the Reference Source tokens. The third-party Consolidation Platform may then identify overlapping and/or unique tokens in the Customer data (i.e., payload) by matching the Customer tokens to the Reference Source tokens located in a Reference Source Token Repository.

In some aspects, Customer tokens and Reference Source tokens may be received by the system. The Customer tokens and Reference Source tokens may be analyzed and compared. The results of the analysis and comparison may overlap in the Customer tokens and/or matching characteristics via comparison with a Reference Token Repository. Specifically, the third-party Consolidation Platform enables the identification of duplicate records and consolidation of data, but the actual consolidating of the data (e.g., merging two records associated with the same entity to create a single record) occurs in the Customer Environment.

Accordingly, the present disclosure provides a plurality of technical benefits including but not limited to: enabling more efficient use of electronic resources for data matching, consolidating, and enabling data enrichment; providing more efficient storage management, since the matching, consolidating, and enrichment of a dataset may occur at a single third-party server; decreasing potential exposure of sensitive data, since all data transmitted to the third party servers is tokenized (i.e., hashed and encrypted); and decreasing manual overload of electronic devices, since the data matching, consolidating, and enrichment occur via computing devices running intelligent algorithms to identify deficiencies in a dataset and remedying those deficiencies from a Reference Source dataset, among other examples.

FIG. 1 illustrates an example of a distributed system for Reference Source matching, as described herein. Example system 100 presented is a combination of interdependent components that interact to form an integrated whole for consolidating and enriching data. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to receive and transmit data. For example, client devices 102, 104, and 106 may contain client-specific data. Client devices may download a third-party tokenization software program via network(s) 108 that may be applied to the client-specific data. The client-specific data may be stored in local databases 110, 112, and 114. Once tokenized, the client-specific data is transformed into "tokens," and these tokens may be transmitted via network(s) 108 and/or satellite 122 to server(s) 116, 118, and/or 120. Server(s) 116, 118, and/or 120 may be third-party servers owned by a Consolidation Platform. In other examples, client-specific data may be stored in servers (in addition to or instead of local client devices and local databases) and may be tokenized and then transmitted from client servers to third-party servers via network(s) 108 and/or satellite 122.

In aspects, a client device, such as client devices 102, 104, and 106, may have access to one or more datasets or data sources and/or databases comprising client-specific data. In other aspects, client devices 102, 104, and 106, may be equipped to receive broadband and/or satellite signals carrying client-specific tokens or unencrypted data (or a mixture of both). The signals and information that client devices 102, 104, and 106 may receive may be transmitted from satellite 122. Satellite 122 may also be configured to communicate with network(s) 108, in addition to being able to communicate directly with client devices 102, 104, and 106. In some examples, a client device may be a mobile phone, a laptop computer, a tablet, a smart home device, a desk phone, and a wearable (e.g., a smart watch), among other devices.

To further elaborate on the network topology, client devices 102, 104, and/or 106 (along with their corresponding local databases 110, 112, and 114) may be owned by a Reference Source. The client devices 102, 104, and/or 106 may download a third-party software program to tokenize the data. The tokens from the Reference Source may be stored locally in local databases 110, 112, and/or 114. In other examples, the tokens may be stored in remote databases/servers 116, 118, and/or 120. In other examples, the tokens may be harbored in both local and external databases. After tokenization, the Reference Source may transmit data via client device(s) 102, 104, and/or 106 that are configured to communicate with local databases 110, 112, 114 and servers 116, 118, and 120. The tokens from the Reference Source may be transmitted via network(s) 108 and/or satellite 122. The Reference Source tokens may be received by third-party servers.

The procedure for tokenizing and transmitting data from the Customer-side and the Reference Source-side may be similar, in that the data may be stored locally initially and subsequently hashed and encrypted on the Customer-owned and/or Reference Source-owned client devices and, once in tokenized form, finally transmitted to third-party servers for analysis, consolidation, and enrichment, among other actions. In other words, FIG. 1 depicts a network topology that may be used in a Customer Environment and/or Reference Source Environment (i.e., client devices 102, 104, and/or 106 may belong to the Client Environment in one example and belong to the Reference Source Environment in another example).

Figure 2:
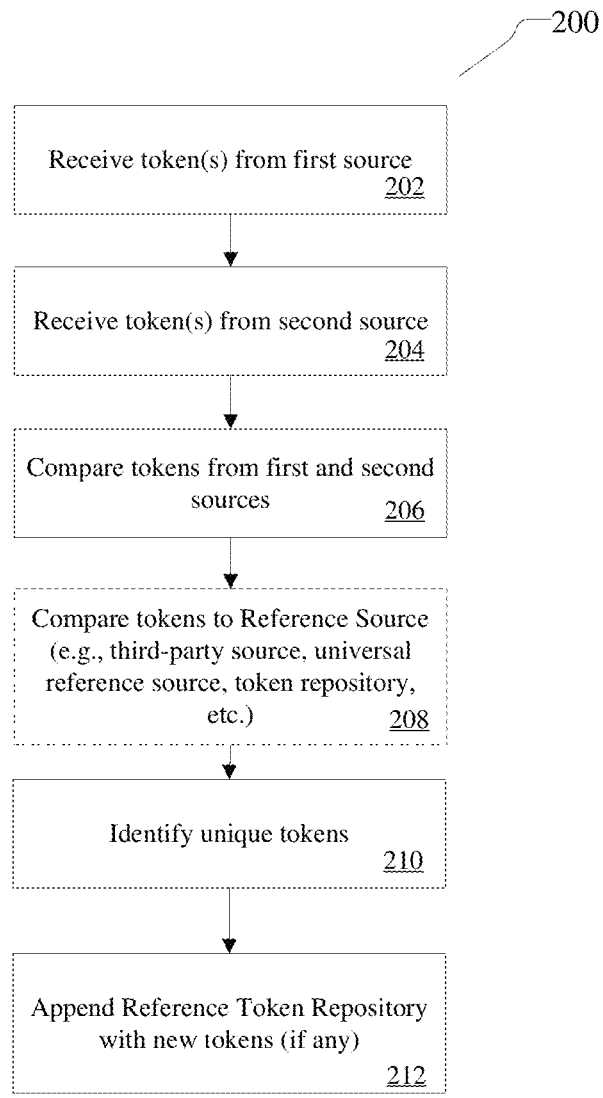
FIG. 2 illustrates an example method for creating a Reference Token Repository and matching tokens using a Reference Token Repository, as described herein.

FIG. 2 illustrates an example method for creating a Reference Token Repository and matching tokens using a Reference Token Repository, as described herein. Each token may be comprise of a single attribute or multiple attributes. For instance, a single token may refer to a group of five attributes, or in some example aspects, the token may refer to a part of a single attribute. Tokens are not limited to one-to-one matching with attributes. Method 200 begins with steps 202 and 204, which is to receive tokens from a first source and a second source. For example, tokens may be received by a single client from two different databases (i.e., two different sources). The tokens may or may not be associated with the same entity.

Prior to the transmission of the tokens at steps 202 and 204 the Customer data may be tokenized at the Customer-side. Prior to receiving the Customer data, Customer client devices may have used a tokenization software program to hash and encrypt (or "mask") the raw Customer data prior to transmission, so what is actually transmitted to the Consolidation Platform are Customer "tokens." Once tokenized, the Customer tokens may be transmitted and received by the third-party Consolidation Platform at step 204. Note that receiving Customer tokens at step 204 and receiving Reference Source tokens at step 208 may be implemented simultaneously or in vice versa order (with reception of the Reference Source tokens happening before the reception of the Customer tokens).

The Customer tokens may be received by the Consolidation Platform and stored on secured servers. After reception of the Customer tokens, the method proceeds to step 206, where the tokens may be compared to each other. This comparison may utilize a matching algorithm, such as A-B matching, deterministic matching, probabilistic matching, and/or a combination of matching algorithms.

After the comparison step in 206, the tokens may then be compared to a Reference Token Repository, if one exists, at step 208. If a Reference Token Repository exists, then the customer tokens can be further compared to the Reference Token Repository to identify tokens that may have already been stored in the repository. For example, if the comparison results at step 206 result in an affirmative match of the two customer tokens, then the tokens can be compared to the reference token repository at step 208. Then, at step 210, if the customer tokens are not located in the Reference Token Repository, one of the matching customer tokens (i.e., a single unique token) can be identified and then subsequently stored in the Reference Token Repository for future use at step 212. In another example, if the customer tokens do not yield a match at step 206 (e.g., through A-B matching), then the customer tokens may still be matched up using transitive matching with the Reference Token Repository at step 208. If the customer token from the first source matches to a token in the Reference Token Repository, and the customer token from the second source matches to the same token in the Reference Token Repository, then by virtue of the transitive matching property, the customer tokens from the first source and the second source match.

Upon identifying that the tokens match, at least one composite (i.e., a consolidation of at least two Customer token records) may be indicated. A composite refers to the consolidation of multiple token records to create a single token record. For example, the Customer tokens may make up multiple token records associated with the same data subject (although, the third-party Consolidation Platform is unable to identify this data subject because the information is tokenized on the third-party Consolidation Platform). A composite of the data subject may be created by consolidating the multiple token records associated with that same data subject. Specifically, one token record may include tokens that, when untokenized, represent data attributes such as Name, date of birth (DOB), Gender, and physical address, while another token record may include tokens that represent data attributes such as Name, email address, and age. The composite record, when transmitted back to the Customer and/or Reference Source environment and untokenized in the Customer and/or Reference Source environment, the consolidated record would include all of the aforementioned data attributes: Name, DOB, Gender, physical address, email address, and age. The end result is a composite record, which is a single record associated with a certain data subject and/or entity. Such a composite record is created in the Customer Environment, so while the third-party Consolidation Platform may facilitate the identification of certain records to be consolidated and/or enriched, the actual consolidation and enrichment happens at the Customer Environment prior to transmission of the Customer tokens to the Consolidation Platform. As used herein, "data subject" may be a person, product, business, entity, etc. The systems and methods described herein are not limited to simply personal data related to human data subjects but can be applied to supply chain data, product data, business entity data, etc.

To further expand on step 208, if a Reference Token Repository has not yet been created, then the method 200 may proceed from step 206 to step 210. The identification of the unique tokens from the customer may be the initial unique tokens that comprise the Reference Token Repository. In other words, this is how a Reference Token Repository can be created. The appending of new and unique tokens to the Reference Token Repository occurs at step 212. This step can also be the initial step in creating the Reference Token Repository. Once the Reference Token Repository is created, then step 208 can be utilized in the method as a further means of comparison and matching customer tokens more accurately using transitive matching. In some aspects, the results of the comparison between the source tokens and the reference source tokens may not yield new unique tokens. In such scenarios, the Reference Token Repository will remain unchanged.

To illustrate the power of transitive matching, consider the situation where a two customer records are associated with the same data subject, but the two records do not have enough overlap/similarities for there to be successful match. This may result in a false negative if record A and record B are indeed records associated with the same data subject. To remedy this false negative problem, the system may rely upon the Reference Token Repository. By using the Reference Token Repository, the system may use a technique known as transitive closure to accurately determine if record A and record B (or, after tokenization, token A and token B) are associated with the same data subject, and if so, create a composite of those records. Token A may be matched up with the Reference Source token, and Token B may be matched up with the same Reference Source token. If the comparison of the tokens reaches a certain matching threshold that confidently determines that token A matches with the Reference Source token and that token B matches with the Reference Source token (i.e., A=R and B=R), then we know that records A and B must match due to the transitive property.

The Reference Source tokens that may be used to help generate a composite of the Customer tokens may derive from different sources. For example, a Reference Token Repository may be created purely based on customer tokens. In other instances, a Reference Token Repository may be created by one or more third-party trusted sources. In yet other examples, the Reference Token Repository may be created through a combination of customer tokens and trusted source tokens.

Reference Source tokens may be received by the Consolidation Platform in the same manner as the Customer tokens. As noted earlier, the Reference Source tokens may be received prior to, simultaneously with, or after the Consolidation Platform receives the Customer tokens at steps 202 and 204. Similar to the receive tokens steps at steps 202 and 204, the Reference Source data may also be tokenized prior to transmission to the Consolidation Platform. The Reference Source devices may use a third-party tokenization software program (e.g., a tokenization software from the Consolidation Platform or another third-party) to tokenize its data prior to transmission. Once tokenized, the Reference Source tokens may be transmitted and received by the Consolidation Platform. The Consolidation Platform will now possess both Customer tokens and Reference Source tokens. As noted with respect to FIG. 1, these tokens may be stored on secured servers owned by the Consolidation Platform, third-party cloud servers, and/or local devices managed by the Consolidation Platform.

In some example aspects, tokens in the Reference Token Repository may possess a rank and/or confidence value based on the comparison frequency of the token to the Reference Token Repository. For example, a certain customer token that is compared to the Reference Token Repository for a first time may indicate to the system that the customer token is not in the Reference Token Repository. As such, the customer token is a "unique" customer token and should be stored in the Reference Token Repository. Subsequently, another customer token from a different data source is compared to the Reference Token Repository, and the comparison results show an affirmative match to the customer token in the Reference Token Repository. As such, that customer token is noted as a duplicate of an already-stored token in the Reference Token Repository, but the fact that the system saw another corroborating customer token that matched with a token in the Reference Token Repository indicates that the particular customer token in the Reference Token Repository has a higher likelihood of accuracy. The more duplicate tokens that are compared to the Reference Token Repository, the higher the confidence value of that certain token in the Reference Token Repository may be. Specifically, a confidence value may be indicative of comparison frequency, i.e., a confidence value of "8" indicates that the token has been compared 8 times to a duplicate token. A confidence value of "0" or "NA" indicates that a particular token stored in the Reference Token Repository has not been compared to a duplicate record, so there are no known corroborating records in the system.

Figure 3:
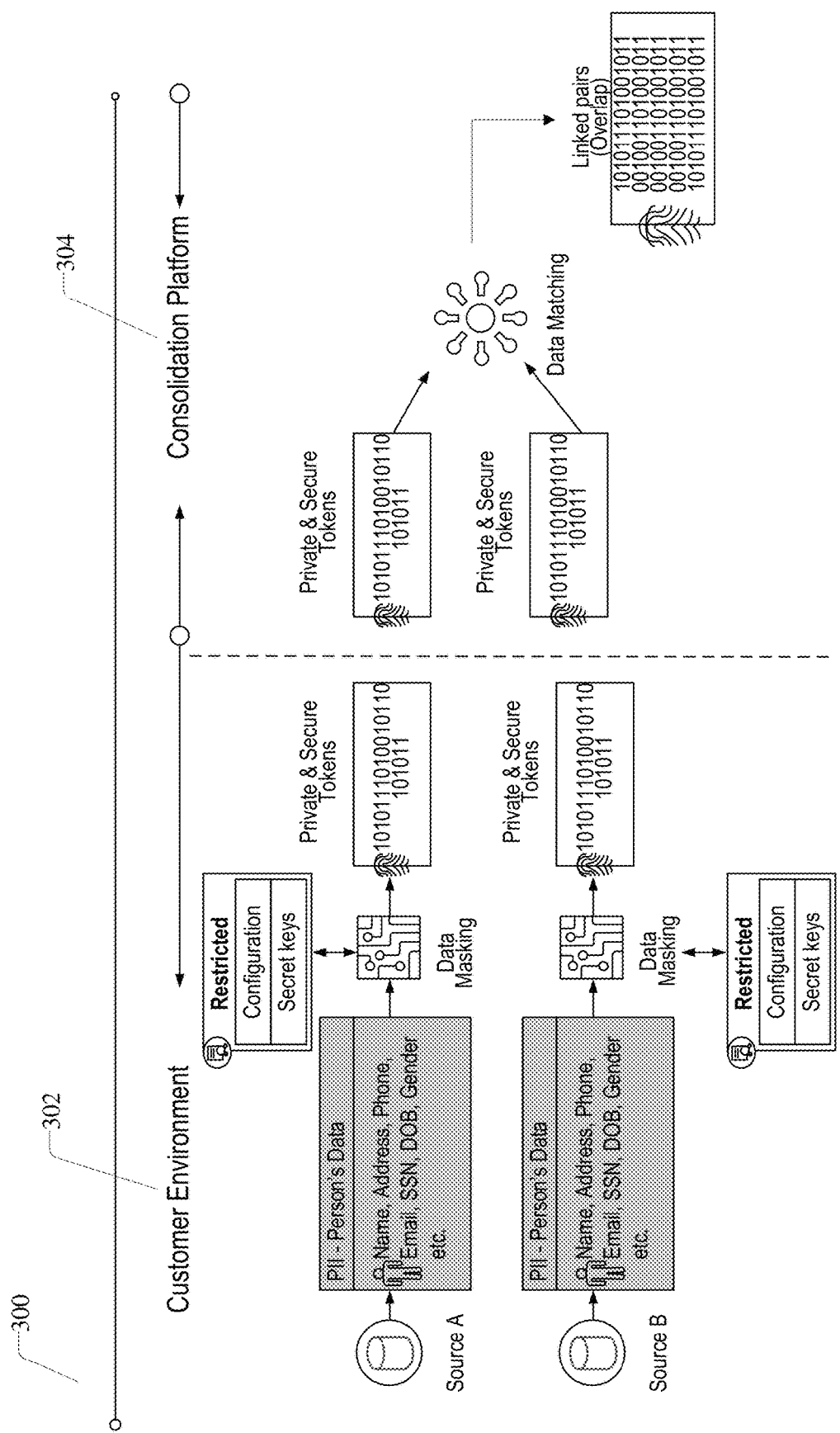
FIG. 3 illustrates an example of a distributed system that includes the Customer environment and the Consolidation Platform environment.

FIG. 3 illustrates an example of a distributed system that includes the Customer environment and the Consolidation Platform environment. The distributed system in FIG. 3 is an example data registry 300. The data registry 300 may be comprised of the Customer environment 302 and the Consolidation Platform 304. As shown in the Customer environment 302, data may be received from multiple Customer databases (e.g., databases Source A and/or Source B). The data may contain multiple data attributes associated with a data subject, such as Name, Address, Phone, Email, SSN, DOB, Gender, etc. The Customer data may be tokenized inside of the Client Environment 302. Once tokenized, the client tokens may be transmitted to the Consolidation Platform 304.

The Consolidation Platform 304 may receive the tokens from the Customer Environment 302 in the form of private and secure tokens. The Consolidation Platform 304 may receive the tokens from the Customer environment in the form of private and secure tokens. Within the Consolidation Platform 306, the tokens from the Customer may be compared, e.g., using A-B matching techniques. At the comparison step, linked pairs (i.e., "overlap") may be identified with tokens. In some examples, a record may also consist of a bit string (i.e., string of 1's and 0's). A "1" may indicate that a certain data attribute exists, whereas a "0" may indicate that the data attribute does not exist. When the tokens for a record are compared, if token or tokens of records have the same value then a linked pair is established based on an established threshold. If the bit values in a matched record pair are different, then at least one of the token records has the data attribute, whereas the other token record does not. If both token records have a "0" in the column, then that particular corresponding data attribute is missing. Specifically, a linked pair may be created by the customer tokens that are transmitted to the Consolidation Platform 304. The customer tokens may then be compared to at least one reference source token. The results of a match between the customer tokens and reference source tokens may prompt the customer to assign a new record ID to reflect the existence of a match.

Figure 4:
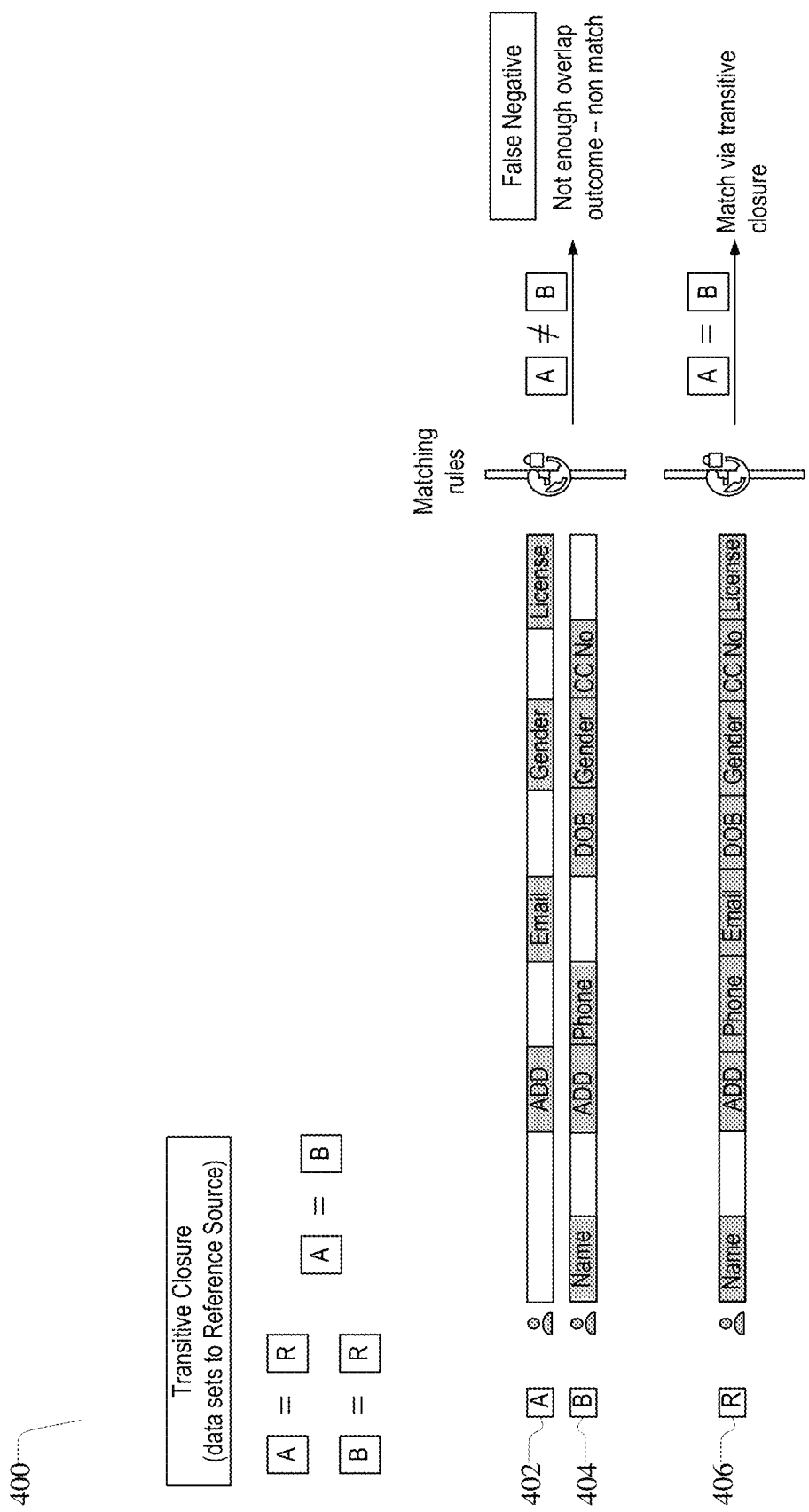
FIG. 4 illustrates an example of transitive matching using a Reference Source.

FIG. 4 illustrates an example of transitive matching using a Reference Source. As illustrated in example 500, data records A (402) and B (404) may contain certain data attributes. Record A (402) may contain an address, email, gender, and license type. Record B (404) may contain name, address, phone, DOB, gender, and credit card number. When these two records are compared to create a "composite" record, however, the system may determine that there is not enough information/overlap between these two records to confidently determine that the records are related to the same data subject. In other words, comparing just record A and record B may result in a "false negative."

By introducing a Reference Source data record 406, records A and B can be matched via the transitive property. In other words, Record A may be compared to Record R, and sufficient overlap may be present to confidently determine that the records are associated with the same data subject. Record B may also be compared to Record R, and sufficient overlap may be present to confidently determine that the records are associated with the same data subject. As such, if Record A=Record R and Record B=Record R, then Record A=Record B.

The transitive matching example 400 may be applied when identifying duplicate records and/or tokens when comparing the tokens to each other and/or to a Reference Token Repository, such as in step 208 of method 200. At least one Reference Source may be utilized to determine whether certain Customer data records are associated with the same data subject.

Of note, at the Consolidation Platform, the transitive matching occurs via tokens—the data attributes displayed in FIG. 4 are for understanding purposes only, as the "data" (i.e., payload) that is actually received and processed by the Consolidation Platform is tokenized. In other words, the Consolidation Platform is blind to the underlying raw data that the tokens represent. The Consolidation Platform may or may not know which token are matched, but regardless, the Consolidation Platform does not know the content of what is matched. The Consolidation Platform, for example, does not know actual content/data of Customer data record A and Customer data record B matching Addresses. Rather, the Consolidation Platform knows that Customer token record A and Customer token record B have a matching token between the two token records (if they do indeed match), but the Consolidation Platform does not know that the matched content a token represents.

Figure 5:
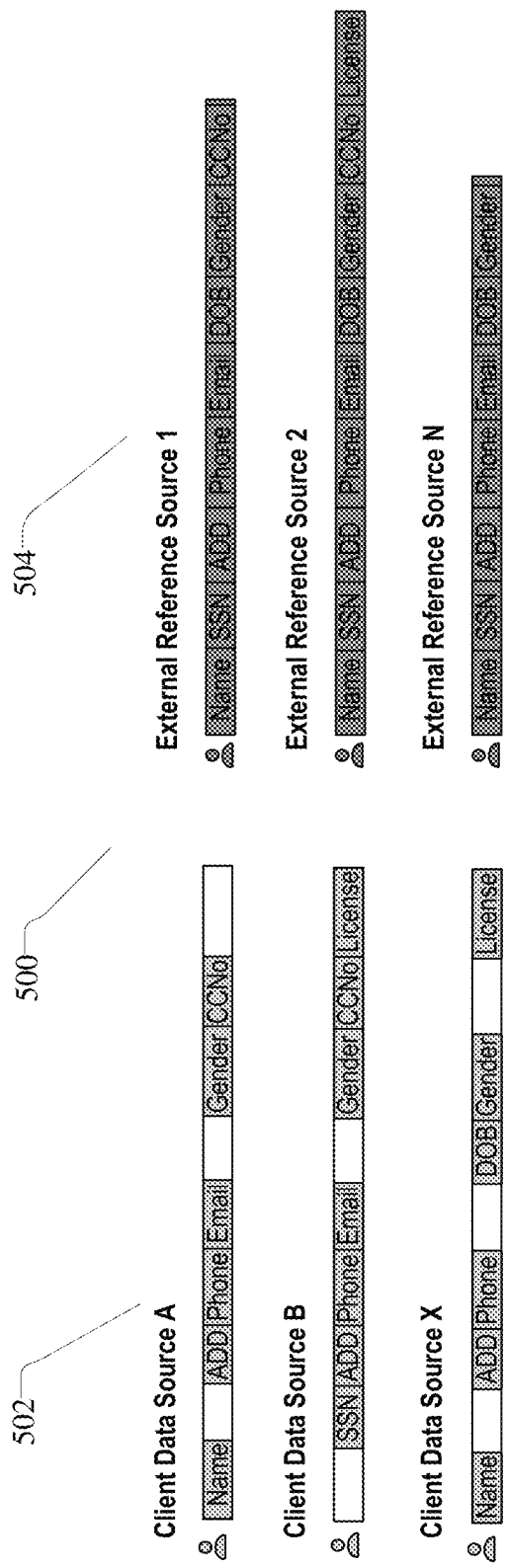
FIG. 5 illustrates example client sources and reference sources.

FIG. 5 illustrates example client sources and reference sources. Client sources 502 may include various client records coming from different data sources, such as data source A, B, and X. Such client records may be tokenized and transmitted to the Consolidation Platform where the client records may be compared amongst each other to identify overlapping tokens. The unique tokens may be stored in a Reference Token Repository.

In other examples, external reference sources may be utilized to contribute to the Reference Token Repository. For instance, tokens from a reference source may be compared to tokens from a client source, and if a match occurs, the unique tokens may be saved in a Reference Token Repository. In further examples, the client tokens and the reference source tokens may be compared to the Reference Token Repository. Based on transitive matching properties, the token may already be stored in the Reference Token Repository, which means that a unique token(s) has already existed.

Figure 6:
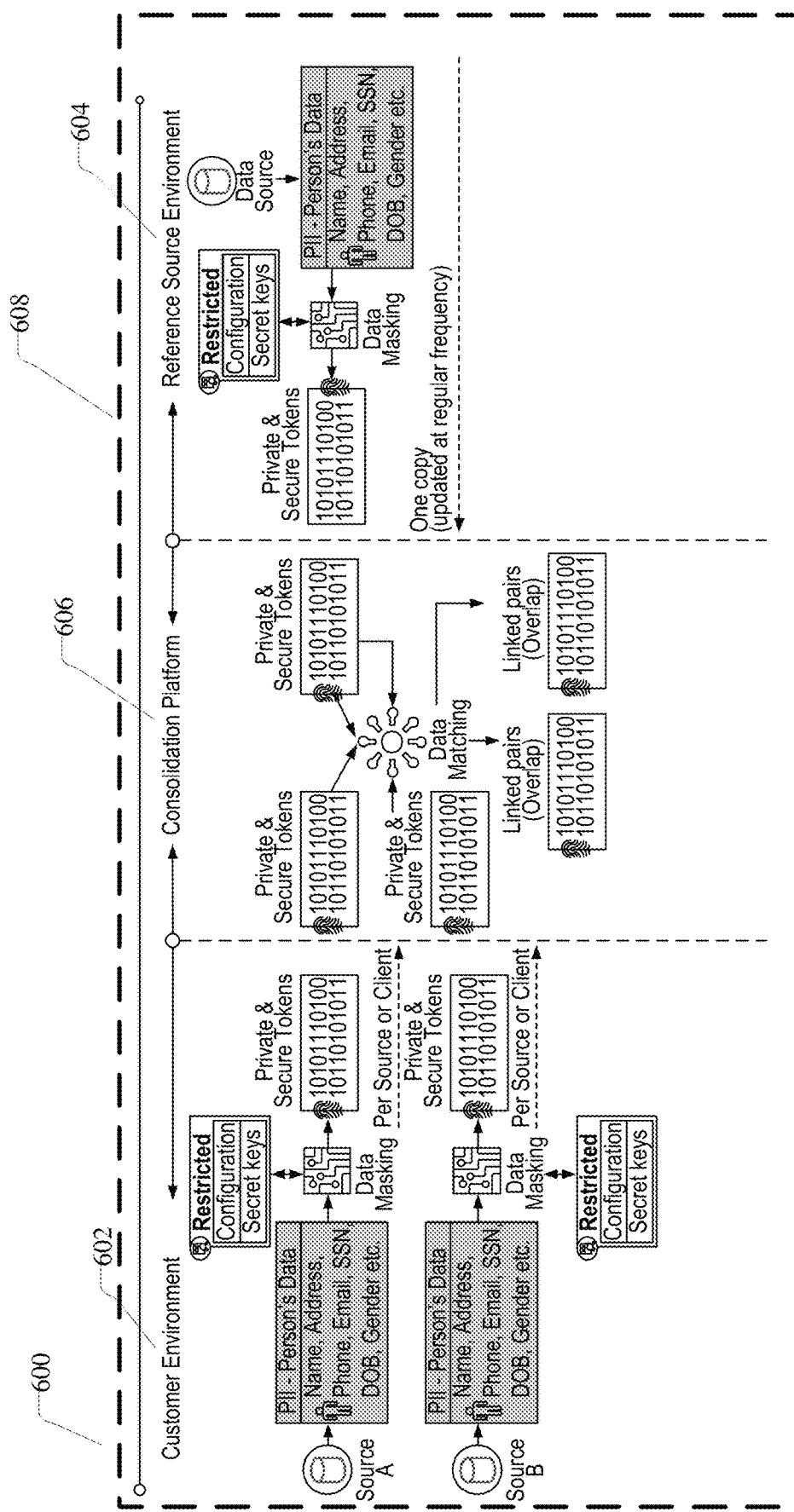
FIG. 6 illustrates an example of a distributed system that includes a Customer environment, a Consolidation environment, and a Reference Source environment.

FIG. 6 illustrates an example of a distributed system that includes a Customer environment, a Consolidation environment, and a Reference Source environment. Similar to FIG. 3, FIG. 6 includes a customer environment 602 and a consolidation platform 606, as well as a reference source environment 604. As noted previously, the customer environment may comprise data from different sources (e.g., source A, source B, etc.). These data records may be masked in the customer environment so that they are in the form of private and secure tokens. The tokens are then transmitted to the consolidation platform 606 for processing. Similarly, the reference source environment may also comprise data records. These data records may be masked according to the same algorithm as the customer environment data records. The output of the reference source data records is also private and secure tokens. These tokens may be similarly transmitted to the consolidation platform 606.

At the consolidation platform 606, the tokens from the customer environment and the tokens from the reference source environment may be compared using known matching techniques, such as A-B or transitive closure matching. If overlap occurs, linked pairs can be created showing which bits overlap from the token. If enough overlap is indicated, then the tokens may be considered a match.

Figure 7:
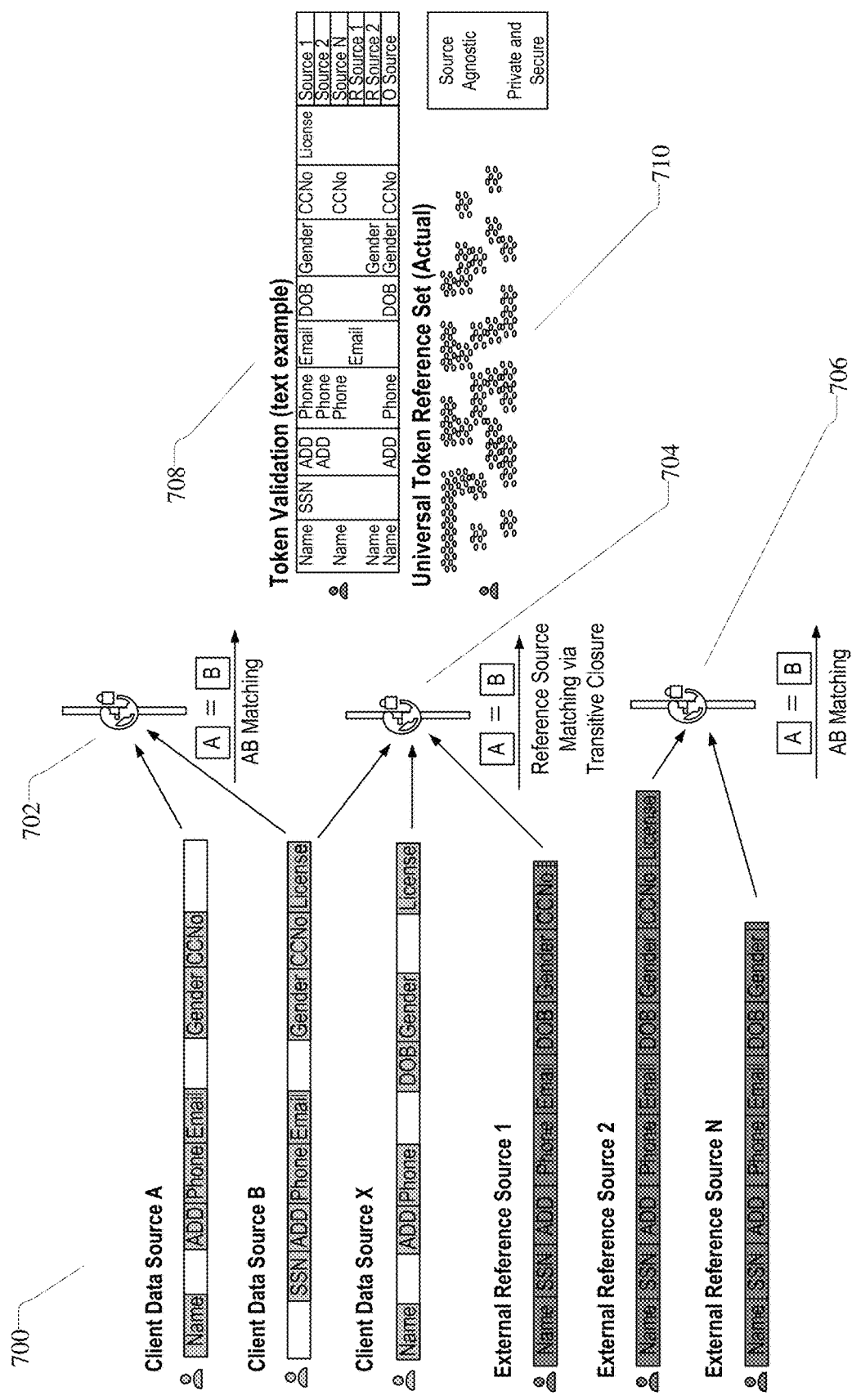
FIG. 7 illustrates an example universal reference token set created through reference source matching.

FIG. 7 illustrates an example universal reference token set created through A-B matching and/or reference source matching. A universal reference set may be a composite of multiple datasets (or "token sets" at the Consolidation Platform) from Reference Sources. The universal reference set may be utilized by a Consolidation Platform to efficiently identify which data attributes from a Customer dataset may be corroborated and/or populated by a Reference Source and which Reference Source may possess the relevant data. By utilizing a universal reference set, a Consolidation Platform may more easily provide recommendations to the Customer as to which Reference Source may have the most relevant data to corroborate and/or populate certain data attributes.

As illustrated, a universal token reference set can be created from a variety of client and external reference sources and/or a combination of both. For instance, two client tokens may be compared and matched via AB Matching at 702. A single unique token record may be created based on this matching and stored in the universal token reference set. In another example, client tokens may be compared to a reference source token at 704. Based on the transitive matching property, a single unique token record may be created and stored in the universal token reference set. In yet another example, two tokens from two reference sources may be compared via AB Matching at 706. If a match is identified, then a single unique token record may be created and stored in the universal token reference set 710.

As illustrated, the Token Validation (text example) 708 displays the various data attributes associated with a data subject that have been compiled by various data sources (e.g., Source 1, Source 2, Source N, T Source 1, T source 2, O Source, etc.). However, in the Consolidation Platform environment (606 from FIG. 6), the Token Validation set 708 will appear as the Universal Token Reference Set (Actual) 710, where particular data attributes and sources are not actually identifiable (i.e., source agnostic), since they are tokenized. In other words, the Token Validation (text example) 708 displays an example of the underlying un-tokenized data that may make up a "universal" reference set, and Universal Token Reference Set (Actual) 710 is the actual, tokenized "universal" reference set that is applied during the comparison step with tokenized Customer data.

Figure 8:
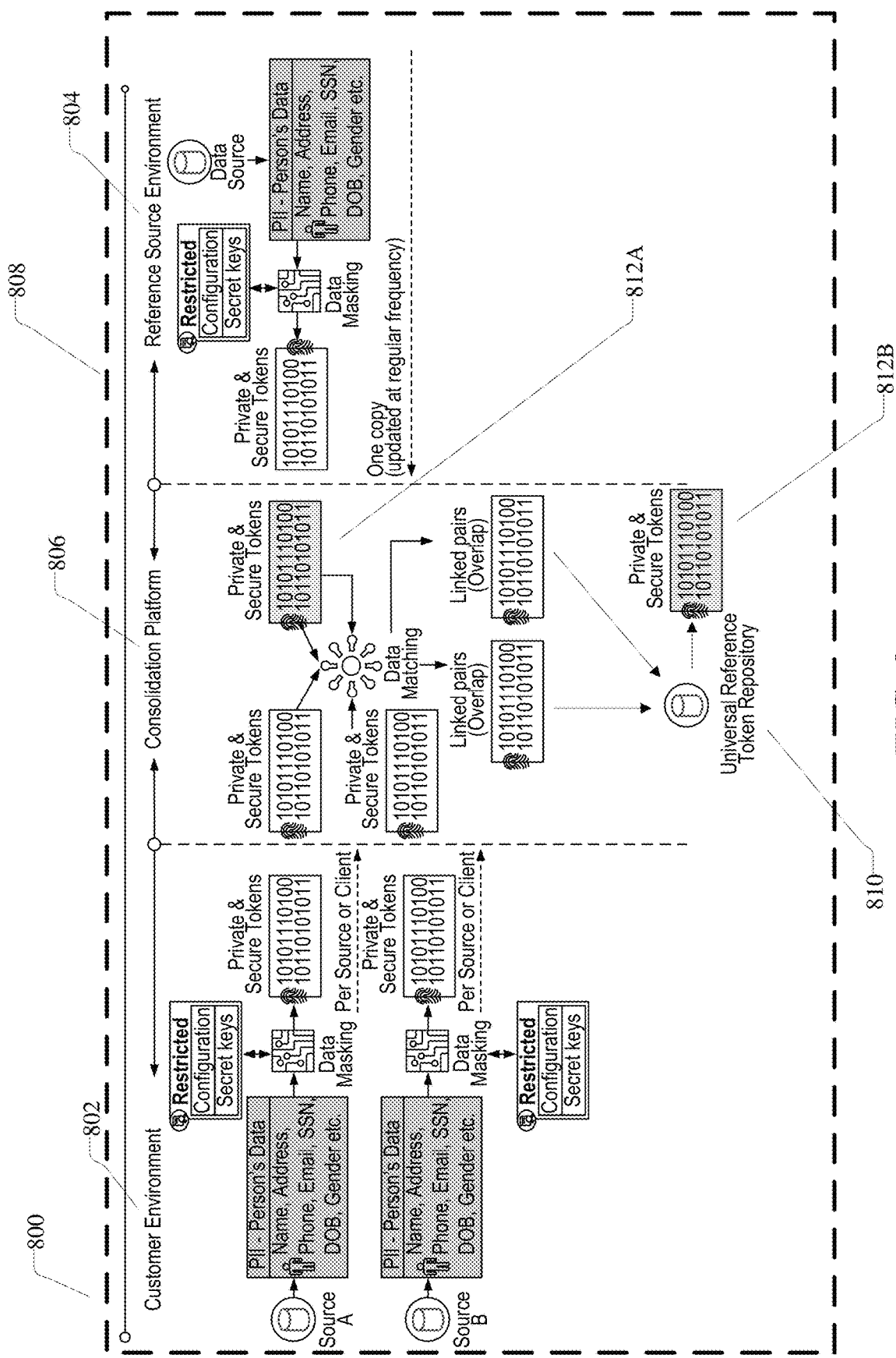
FIG. 8 illustrates an example of a distributed system that includes a Customer environment, a Consolidation environment with a Universal Reference Token Repository, and a Reference Source environment.

FIG. 8 illustrates an example of a distributed system that includes a Customer environment, a Consolidation environment with a Universal Reference Token Repository, and a Reference Source environment. As previously illustrated in FIGS. 3 and 6, the distributed system 800 of FIG. 8 contains customer environment 802, reference source environment 804, and consolidation platform 806. In addition to these components, the consolidation platform 806 also comprises a Universal Reference Token Repository 810. The Universal Reference Token Repository 810 is comprised of unique tokens (i.e., no duplicates. The unique tokens are identified during the data matching process. For instance, private and secure tokens from the customer environment (e.g., from source A and source B) may be transmitted to consolidation platform 806. Similarly, private and secure tokens from the reference source environment 804 may be transmitted to the consolidation platform 806. At the consolidation platform 806, the tokens may be compared with one another via AB Matching and/or transitive matching and/or other matching algorithms. The results of the matching are linked pairs that show which tokens overlap and which tokens do not overlap. A certain overlapping percentage may indicate the existence of a match. In this instance, a token 812A from the reference source environment 804 may be matched with tokens from the customer environment that come from sources A and B. Based on the linked pairs, the system indicates that the token 812A matches with the customer tokens. As such, the Universal Reference Token Repository 810 will store a single copy of that token 812B for future use if the comparison yields new information (i.e., tokens 812B will be updated based on new matching information). In other words, even though the same token may derive from the customer environment and the reference source environment, the Universal Reference Token Repository only stores a single instance of this token to avoid duplication. Tokens 812A may be a token repository, and Tokens 812B may be a token repository. Token repository 812A may be the same as token repository 812B for reference source matching.

Figure 9:
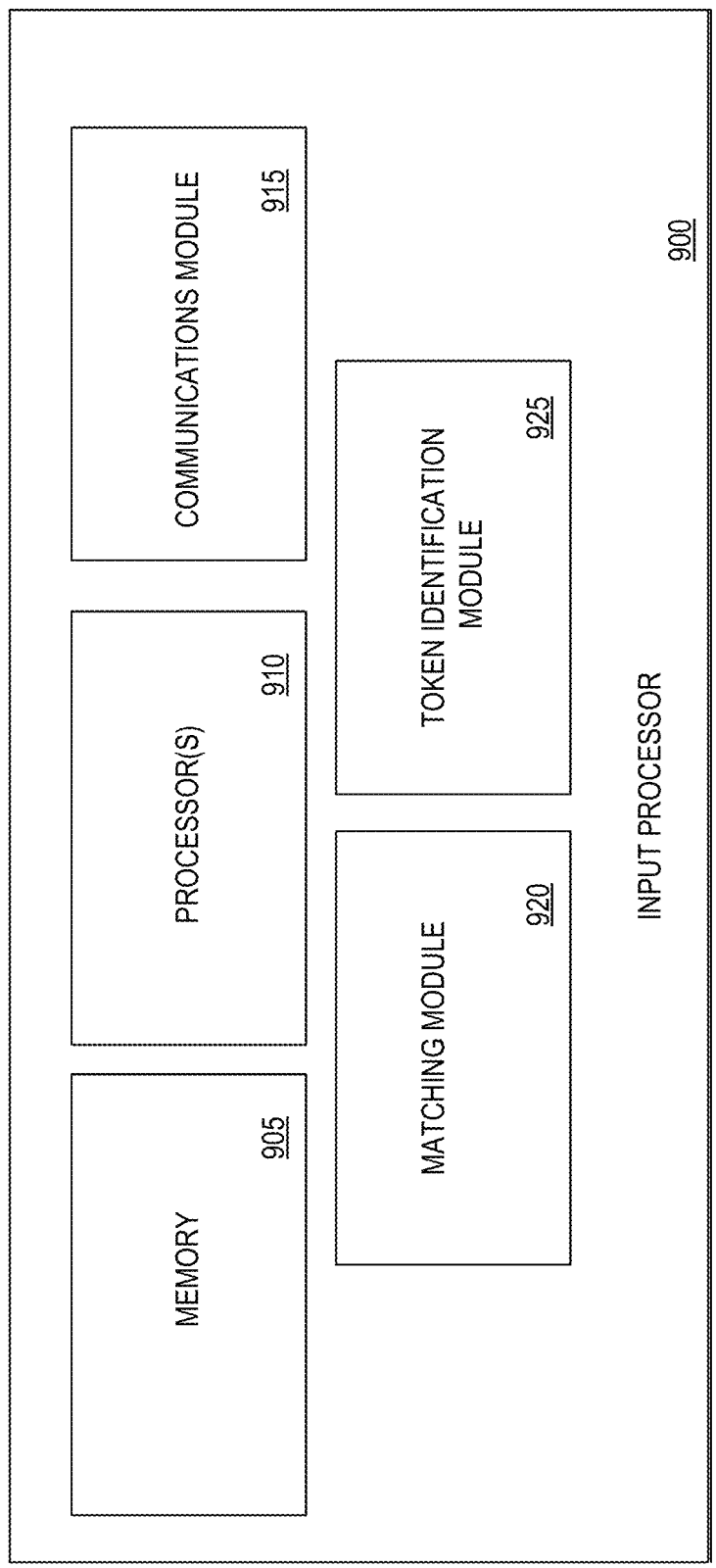
FIG. 9 illustrates an example input processor for implementing systems and methods for consolidating and enriching data, as described herein.

FIG. 9 illustrates an example input processor for implementing systems and methods for consolidating and enriching data, as described herein. Input processor 900 may be embedded within a client device (e.g., client devices 102, 104, and/or 106), remote web server device (e.g., devices 116, 118, and/or 120), and other devices capable of implementing systems and methods for consolidating and enriching data. The input processing system contains one or more data processors and is capable of executing algorithms, software routines, and/or instructions based on processing data provided by at least one client source and/or Reference Source. The input processing system can be a factory-fitted system or an add-on unit to a particular device. Furthermore, the input processing system can be a general-purpose computer or a dedicated, special-purpose computer. No limitations are imposed on the location of the input processing system relative to a client or remote web server device, etc. According to embodiments shown in FIG. 9, the disclosed system can include memory 905, one or more processors 910, communications module 915, matching module 920, and token identification module 925. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 905 can store instructions for running one or more applications or modules on processor(s) 910. For example, memory 905 could be used in one or more embodiments to house all or some of the instructions needed to execute the functionality of matching module 920 and/or token identification module 925, as well as communications module 915. Generally, memory 905 can include any device, mechanism, or populated data structure used for storing information. In accordance with some embodiments of the present disclosures, memory 905 can encompass, but is not limited to, any type of volatile memory, nonvolatile memory, and dynamic memory. For example, memory 905 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 905 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 905.

Communications module 915 is associated with sending/receiving information (e.g., matched by matching module 920, and/or identified by token identification module 925), commands received via client devices or server devices, other client devices, remote web servers, etc. These communications can employ any suitable type of technology, such as Bluetooth, WiFi, WiMax, cellular (e.g., 5G), single hop communication, multi-hop communication, Dedicated Short Range Communications (DSRC), or a proprietary communication protocol. In some embodiments, communications module 915 sends information output by matching module 920 (e.g., matching tokens), and/or token identification module 925 (e.g., identifying a unique token based on the match to store in a Universal Reference Token Repository) to client devices 102, 104, and/or 106, as well as memory 905 to be stored for future use. In some examples, communications modules may be constructed on the HTTP protocol through a secure REST server(s) using RESTful services.

Matching module 920 is configured to receive at least two sets of data, e.g., dataset A and dataset B. The module 920 may also receive and maintain at least one reference dataset (e.g., Reference Source dataset, universal reference set, etc.). Matching module 920 may be configured to compare dataset A and dataset B via matching algorithms, such as AB matching. Module 920 may further be configured to compare dataset A to the reference dataset and compare dataset B to the reference dataset. The comparison analysis may reveal that dataset A matches sufficiently to the reference dataset and that dataset B matches sufficiently to the reference dataset. If dataset A matches to the reference dataset and dataset B matches to the reference dataset, then dataset A matches to dataset B via the transitive property. Matching module 920 may also accept single data records and compare the data records to data records from the at least one dataset that is maintained by transitive matching module 920. Matching module 920 is also configured to execute the transitive matching analysis on tokens. In other words, at least two token sets may be compared against a Reference Source token set, and if token set A matches to the Reference token set and token set B matches to the Reference token set, then token set A matches token set B via the transitive property.

Token Identification module 925 may be configured to identify a single unique token record that is determined to be a match to another token based on the results of matching module 920. If a match is indicated from matching module 920, then a copy of the matched token may be obtained by token identification module 925 and stored in a reference token repository, such as Universal Reference Token Repository 810 from FIG. 8. Token identification module 925 may also be configured to identify already-stored tokens in a token repository. For instance, based on the results of matching module 920, a unique token may be identified but not stored in the Universal Reference Token Repository because the unique token already exists, and the Universal Reference Token Repository will not accept duplicate tokens.

Figure 10:
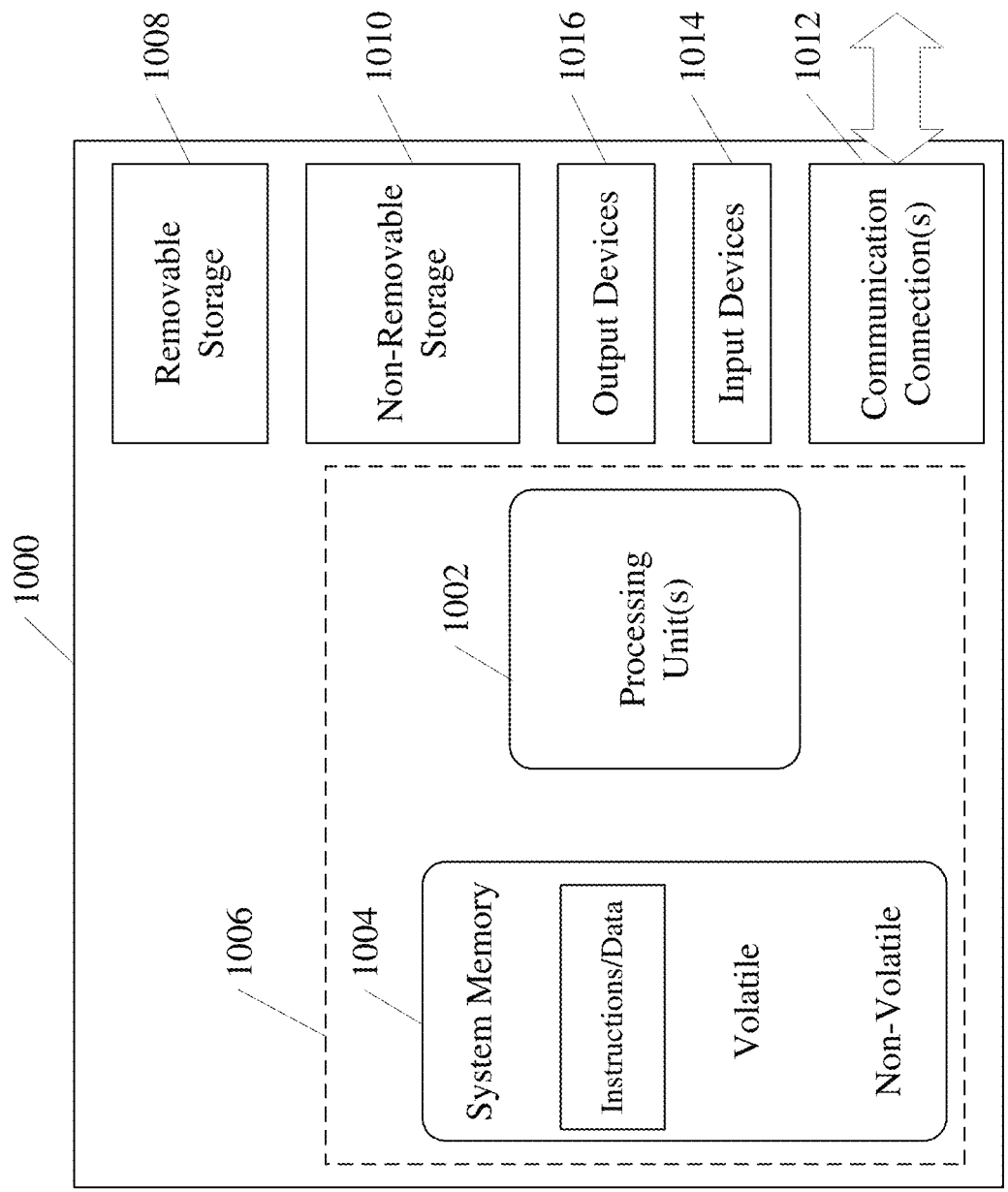
FIG. 10 illustrates one example of a suitable operating environment in which one or more of the present embodiments may be implemented.

FIG. 10 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 1000 typically includes at least one processing unit 1002 and memory 1004. Depending on the exact configuration and type of computing device, memory 1004 (storing, among other things, information related to detected devices, association information, personal gateway settings, and instructions to perform the methods disclosed herein) may be volatile (such as RAM), non-volatile (such as ROM, flash memory, etc.), or some combination of the two. This most basic configuration is illustrated in FIG. 10 by dashed line 1006. Further, environment 1000 may also include storage devices (removable, 1008, and/or non-removable, 1010) including, but not limited to, magnetic or optical disks or tape. Similarly, environment 1000 may also have input device(s) 1014 such as keyboard, mouse, pen, voice input, etc. and/or output device(s) 1016 such as a display, speakers, printer, etc. Also included in the environment may be one or more communication connections, 1012, such as LAN, WAN, point to point, etc.

Operating environment 1000 typically includes at least some form of computer readable media. Computer readable media can be any available media that can be accessed by processing unit 1002 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies non-transitory computer readable instructions, data structures, program modules, or other data. Computer readable instructions may be transported in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 1000 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A system for reference source matching without receiving identifiable personal information, comprising:
    a memory configured to store non-transitory computer readable instructions; and
    a processor communicatively coupled to the memory, wherein the processor, when executing the non-transitory computer readable instructions, is configured to:
        receive at least one token record from a first source and at least one first attributes bit string associated with the at least one token record from the first source;
        receive at least one token record from a second source and at least one second attributes bit string associated with the at least one token record from the second source;
        wherein the first token record and the second token record each comprise masked personal data attributes;
        compare the at least one token record from the first source to the at least one token record from the second source by comparing the at least one first attributes bit string to the at least one second attributes bit string;
        generate at least one linked pair, wherein the linked pair indicates a degree of overlap of tokens associated with the at least one token record from the first source and the at least one token record from the second source;
        based on the degree of overlap from the at least one linked pair, determine whether the at least one token record from the first source matches to the at least one token record from the second source;
        based on the determination of a match of the at least one token record from the first source to the at least one token record from the second source, create a unique token record in a customer environment, wherein the unique token is a single token record representing the at least one token from the first source and the at least one token from the second source;
        compare the unique token to at least one universal reference token repository; and
        based on a determination that the unique token is not present in the at least one universal token repository, store the unique token in the universal reference token repository.

2. The system of claim 1, wherein the at least one token from the first source is associated with at least two data records.

3. The system of claim 1, wherein the at least one universal reference token repository is comprised of at least one of: a customer token and a reference source token.

4. The system of claim 1, wherein the first source is at least one of: a customer source and a reference source.

5. The system of claim 1, wherein the second source is at least one of: a customer source and a reference source.

6. The system of claim 1, configured to compare the at least one token from the first source to the at least one token from the second source, wherein the comparison applies at least one of: AB matching and transitive matching.

7. The system of claim 4, wherein the Reference Source is at least one of: a government entity, a credit bureau, and a bank.

8. The system of claim 6, wherein the comparison further comprises applying transitive matching between at least two customer tokens and at least one reference source token.

9. The system of claim 6, wherein the comparison further comprises applying AB matching between at least one of: two customer tokens and two reference source tokens.

10. The system of claim 4, wherein the reference source is a universal reference source, wherein the universal reference source is comprised of more than one reference source.

11. A method for creating a universal token repository without receiving identifiable personal information, comprising:
    receiving at least one token record from a first source and at least one first attributes bit string associated with the at least one token record from the first source;
    receiving at least one token record from a second source and at least one second attributes bit string associated with the at least one token record from the second source;
    wherein the first token record and the second token record each comprise masked personal data attributes;
    comparing the at least one token or token record from the first source to the at least one token or token record from the second source by comparing the at least one first attributes bit string to the at least one second attributes bit string using AB matching;
    generating at least one linked pair, wherein the linked pair indicates a degree of overlap of tokens associated with the at least one token record from the first source and the at least one token record from the second source;
    based on the degree of overlap from the at least one linked pair, determining that the at least one token from the first source and the at least one token from the second source match;
    creating a unique token record in a customer environment, wherein the unique token is a token representing the at least one token from the first source and/or the at least one token from the second source;
    comparing the unique token to at least one universal reference token repository; and
    based on a determination that the unique token is not present in the at least one universal token repository, storing the unique token in the universal reference token repository.

12. The method of claim 11, wherein the at least one token from the first source and the at least one token from the second source are encrypted with the same encryption algorithm.

13. The method of claim 11, further comprising:
receiving at least one token record from a third source;
comparing the at least one token record to the universal token repository;
determining that the at least one token from the third source does not exist in the universal token repository;
based on the determination that the at least one token from the third source does not exist in the universal token repository, generate a second unique token record that represents the at least one token from the third source; and
store the second unique token in the universal token repository.

14. The method of claim 13, wherein the third source is at least one of: a customer source and a reference source.

15. The method of claim 14, wherein the reference source is at least one of: a government, a credit bureau, and a bank.

16. The method of claim 11, further comprising:
receiving at least one token record from a third source;
receiving at least one token record from a fourth source; and
comparing the at least one token from the third source and the at least one token from the fourth source to the universal token repository using transitive matching.

17. The method of claim 16, wherein the third source is at least one of: a customer source and a reference source.

18. The method of claim 16, wherein the fourth source is at least one of: a customer source and a reference source.

19. The method of claim 11, wherein the unique token comprises a confidence value, wherein the confidence value indicates a degree of accuracy.

20. A computer-readable media storing non-transitory computer executable instructions that when executed cause a computing system to perform a method for reference source matching without receiving identifiable personal information:
receiving at least two tokens from a customer source in a customer environment and at least one first attributes bit string associated with the at least two token records from the customer source;
receiving at least one token from a reference source and at least one second attributes bit string associated with the at least one token record from the reference source;
comparing the at least two tokens from the customer source to each other via AB matching;
based on a determination that the at least two tokens from the customer source do not match, comparing the at least two tokens from the customer source to the at least one token from the reference source by comparing the at least one first attributes bit string to the at least one second attributes bit string via transitive matching;
generate at least one linked pair, wherein the linked pair indicates a degree of overlap of tokens associated with the at least one token record from the customer source and the at least one token record from the reference source;
based on the degree of overlap from the at least one linked pair, determine whether the at least one token from the customer source matches to the at least one token from the reference source;
based on the determination of a match of the at least one token from the customer source to the at least one token from the reference source, create a unique token record in the customer environment, wherein the unique token record is a record representing at least one of: the at least one token from the customer source and the at least one token from the reference source;
compare the unique token to at least one universal reference token repository; and
based on a determination that the unique token is not present in the at least one universal token repository, store the unique token in the universal reference token repository.

* * * * *